UNITED STATES PATENT OFFICE.

HENRY B. RADFORD, OF CHICAGO, ILLINOIS, ASSIGNOR TO JOHN A. LYONS, OF CHICAGO, ILLINOIS.

CLEANING AND POLISHING COMPOUND.

No. 852,903.   Specification of Letters Patent.   Patented May 7, 1907.

Application filed August 6, 1906. Serial No. 329,278.

To all whom it may concern:

Be it known that I, HENRY B. RADFORD, a citizen of the United States, residing at Chicago, in the county of Cook and State of Illinois, have invented a certain new and useful Improvement in Cleaning and Polishing Compounds, of which the following is a specification.

My invention relates to a compound to be used for cleaning and polishing the surface of steel, iron or other metals; and has for its object to make a compound which will not explode, if used in the vicinity or presence of flame from a fire, a light, or other source of combustion.

It is well known that in compounds or liquid preparations heretofore used in cleaning and polishing metal surfaces, more or less danger of explosion will be present owing to the fact that the compounds or preparations contain benzin or gasolene as the cleansing medium, and therefore such compounds or preparations are objectionable for general use. This objection to the liability of explosion is entirely overcome with the compound or preparation of the present invention.

The compound of my present invention may be made in the form of powder, paste, emulsion or liquid. When made by the full formula given below it is in the form of a liquid; but when it is desired to make it in the form of a powder, paste or emulsion the water is omitted in whole or in part. Otherwise the general formula is applicable. When made in the form of a liquid the compound consists of neatsfoot oil, oxalic acid, powdered pumice stone, powdered tripoli, oil of gaultheria and water, which ingredients are to be thoroughly and intimately mixed and brought together so as to make a homogeneous mixture capable of use for cleaning or polishing purposes.

The above named ingredients are to be mixed in proper proportions to obtain a resultant or mixture that will possess the requisite cleaning and polishing properties. A mixture thereof in the following proportions will be found efficient, viz: sixteen ounces neatsfoot oil, four ounces oxalic acid, four ounces powdered pumice stone, four ounces powdered tripoli, one-eighth of an ounce of oil of gaultheria; and sufficient water to make one gallon of the mixture or compound.

The foregoing proportions will produce a compound or mixture in liquid form and having the requisite properties for cleaning and polishing metal surfaces; but it is not my intention to confine the proportions of the various ingredients to those here given, the only requirement being that the proportions shall be such as to form a compound or mixture capable of being used to clean and polish metal surfaces.

The liquid compound or mixture can be prepared in the following manner: The oils are to be first intimately mixed with water and one or more of the other ingredients, except the acid, after which a sufficient quantity of water is to be gradually added and the mixture stirred well during the adding thereof until the oil is minutely divided and suspended in the water, forming a creamy mass. The acid is then added either in the form of crystals or powder, or a proportionate aqueous solution, after which enough water is supplied to the compound or mixture to make one gallon. The resultant will be a homogeneous mixture of oils, acid and water in which the solids will settle when the mixture or compound is left standing.

The compound or mixture can be put up in suitable receptacles capable of receiving and retaining the same for use, and in use the compound or mixture is to be applied to the metal surface and rubbed over the surface to effect the cleaning and polishing of the surface, and no film or scum will be left on the surface as has heretofore been the case where oxalic acid, pumice stone and other ingredients have been used for the purpose of polishing or brightening metal surfaces. The film or scum produced by the use of oxalic acid, pumice and other ingredients will be loosened by the oils so that such film or scum can be rubbed off or removed with a minimum of labor, and in addition a thin film of oil is spread over the cleaned or brightened surface and protects the surface from the ill effects of atmospheric action.

The acid in the compound or mixture attacks any discolored portion of the metal surface due to oxidation or other cause, and removes such discoloration, leaving the surface exposed to the polishing effect of the compound, so that a uniform and equal polish will be given to the entire metal surface. The compound or mixture is not of an explosive nature nor will it burn, and this result of being non-explosive and non-inflammable, is derived from the fact that while there is a small percent of oil present in the compound or mixture, the oil is in such a finely divided state and so intimately mixed with the water that flame or heat cannot cause the oil to burn or ignite, thus insuring perfect safety in the use of the compound or mixture in the presence of flame from a fire, a light or other source of combustion.

The compound or mixture of the present invention possesses the qualities of effecting a uniform and perfect cleaning and polishing or brightening of metal surfaces when applied thereto and subjected to the necessary rubbing, and in addition is not explosive or inflammable, so that its use is not attended with any danger even when used in the presence of flame.

What I claim as new and desire to secure by Letters Patent is:

1. A compound for cleaning and polishing metal surfaces, consisting of neatsfoot oil, oxalic acid, powdered pumice stone, powdered tripoli and oil of gaultheria, substantially as described.

2. A compound for cleaning and polishing metal surfaces, consisting of neatsfoot oil, oxalic acid, powdered pumice stone, powdered tripoli, oil of gaultheria, and water, substantially as described.

3. A compound for cleaning and polishing metal surfaces, consisting of sixteen ounces of neatsfoot oil, four ounces oxalic acid, four ounces powdered pumice stone, four ounces powdered tripoli, one-eighth ounce oil of gaultheria, and sufficient water to make a gallon of the mixture or compound, substantially as described.

HENRY B. RADFORD.

Witnesses:
EPHRAIM BANNING,
JOHN A. LYONS.